Aug. 2, 1932.  E. G. K. ANDERSON  1,869,646
SWITCH BOX
Filed Sept. 13, 1929
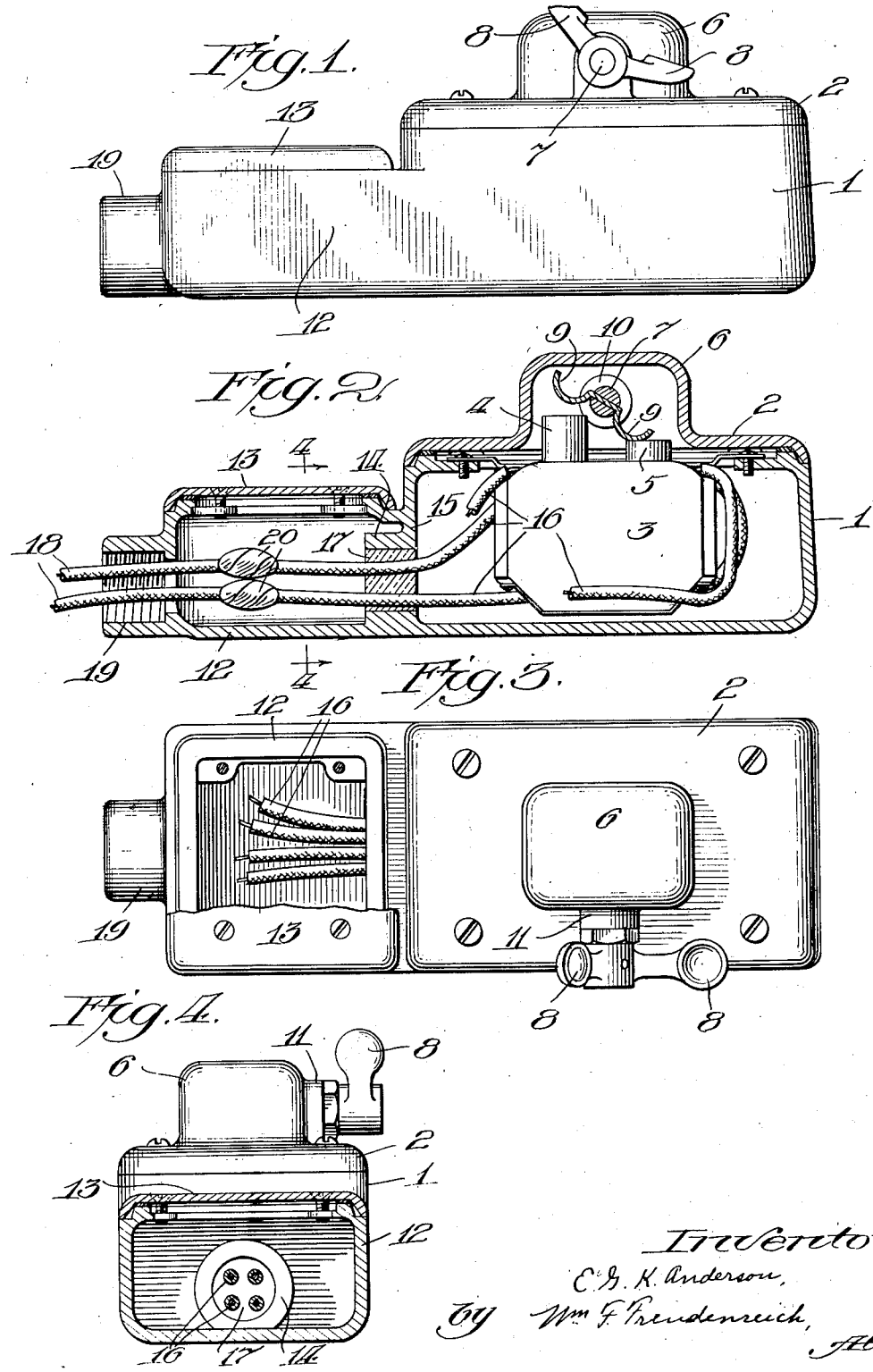
Inventor:
C. G. K. Anderson,
by Wm. F. Freudenreich, Patented Aug. 2, 1932

1,869,646

UNITED STATES PATENT OFFICE

ERNST G. K. ANDERSON, OF EVANSTON, ILLINOIS, ASSIGNOR TO APPLETON ELECTRIC COMPANY, A CORPORATION OF ILLINOIS

SWITCH BOX

Application filed September 13, 1929. Serial No. 392,279.

It is the practice to place small switches of the wall type in the electrical systems of buildings in small boxes into which the conductors are led, usually through a conduit. The conductors are usually connected directly to the terminals on the switch, making it necessary to expose the switch and manipulate the terminals when connecting the switch in the system. Furthermore, gases or other fluids or other foreign matter may enter the opening through which the conductors pass into the box.

The object of the present invention is to produce a simple and novel switch box construction in which the switch need not be exposed when connecting it to the conductors of an electrical system but may at all times be completely enclosed. Or, viewed in another aspect, my invention may be said to have for its object to permit line conductors to be readily connected to an enclosed switch without exposing the switch or disturbing the same or any part thereof.

A further object is to produce a simple and novel operating means for an enclosed switch construction that will be effective to prevent the entrance of fluids or other foreign matter during the operation of the switch.

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is a side elevation of a device constructed in accordance with the present invention; Fig. 2 is a vertical longitudinal section through the device; Fig. 3 is a top plan view, the major portion of one of the covers being broken away; and Fig. 4 is a section on line 4—4 of Fig. 2.

Referring to the drawing, 1 represents a box open at the top and having a cover 2 for tightly closing the same. Within the box is a switch 3 shown as being of the type having push buttons 4 and 5 for operating the same. The cover has a raised part 6 in the form of an inverted cup, above the push buttons. A shaft 7 extends transversely through this raised part and has on its outer end finger pieces 8 for turning the same. Fixed to the shaft within the chamber and the cover are fingers 9, 9 for engaging with the push buttons to press down either button while allowing the other one to rise. The walls through which the shaft passes are thickened in the form of bosses 10 and 11, to provide long bearings for the shaft and insure against the entrance of fluids or other foreign matter past the shaft and into the switch chamber.

Beyond one end of the switch box, and fixed thereto, is a second smaller box 12 open at the top and having a suitable cover 13 for tightly closing the same. In the arrangement shown, the two boxes are in the form of a single casting. The chambers within the two boxes are connected by an opening through the dividing wall between the same. In the arrangement shown, this opening is the bore in an elongated hub or boss 14 extending from the dividing wall 15 into the chamber in the box 12. Conductors 16 are connected to the switch and lead out through the hub or boss into the box 12. Into the hub or boss, around the conductors, is placed a filling of insulating material 17, preferably sealing wax or other material that can be introduced in a plastic or molten and produce a seal that effectively shuts off communication between the two chambers.

The main or line wires 18 enter the chamber in the auxiliary or connection box through any usual or suitable inlet 19.

It will be seen that after the switch has been assembled in the box, the sealing wires carried therefrom into the auxiliary chamber, and the opening between the two chambers sealed, the switch need not be disturbed or exposed upon connecting it into an electrical system; the line wires being simply brought into the auxiliary or connection chamber and being there joined to the wires, as indicated at 20. Furthermore the switch is at all times housed in a chamber which, for all practical purposes, may be said to be hermetically sealed, so that no gases or other fluids, or other foreign matter can enter the switch chamber. The bearings for the switch operating shaft are long, so that the openings in the switch box through which the shaft passes are substantially sealed.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:—

A switch box adapted to form an air-tight enclosure for a switch while permitting the switch to be opened and closed from without the box, composed of an integral box having a switch chamber and a connection chamber joined together by a passage, a detachable air-tight cover for the switch chamber, a switch-operating element extending through and movable in said cover and making a fluid-tight joint therewith, wires extending through said passage from one of said chambers to the other, and a sealing compound filling said passage around and in intimate contact with said wires to close communication between said chambers, the switch chamber being substantially air-tight after the passage has been filled with the sealing compound and the cover has been closed.

In testimony whereof, I sign this specification.

ERNST G. K. ANDERSON.